(12) United States Patent
Kim

(10) Patent No.: US 9,894,734 B2
(45) Date of Patent: Feb. 13, 2018

(54) STRETCHABLE DISPLAY DEVICE AND METHOD OF MANUFACTURING THE SAME

(71) Applicant: SAMSUNG DISPLAY CO., LTD., Yongin, Gyeonggi-do (KR)

(72) Inventor: Young Chan Kim, Incheon (KR)

(73) Assignee: Samsung Display Co., Ltd., Yongin, Gyeonggi-do, (KR)

( * ) Notice: Subject to any disclaimer, the term of this patent is extended or adjusted under 35 U.S.C. 154(b) by 44 days.

(21) Appl. No.: 14/803,267

(22) Filed: Jul. 20, 2015

(65) Prior Publication Data
US 2016/0212822 A1 Jul. 21, 2016

(30) Foreign Application Priority Data
Jan. 15, 2015 (KR) .................. 10-2015-0007458

(51) Int. Cl.
*G06F 1/16* (2006.01)
*H05B 33/22* (2006.01)
*H05B 33/14* (2006.01)
*H05B 33/10* (2006.01)

(52) U.S. Cl.
CPC .......... *H05B 33/22* (2013.01); *G06F 1/1601* (2013.01); *H05B 33/10* (2013.01); *H05B 33/145* (2013.01)

(58) Field of Classification Search
CPC ......... G06F 1/1643; G06F 2203/04102; G06F 1/1652; G06F 3/0488; G06F 1/1626; G06F 1/1601; G06F 1/16; G06F 1/1637; G06F 1/1618; G06F 1/1684; H05B 33/22; H05B 33/145; H05B 33/10; H05K 5/0017; H05K 1/028; H05K 5/0217; H05K 2201/051; H05K 2201/10128
USPC ........... 361/679.01, 679.09, 679.21, 679.26, 361/679.27; 455/575.1–575.4; 349/58–60; 345/173
See application file for complete search history.

(56) References Cited

U.S. PATENT DOCUMENTS 8,729,524 B2  5/2014 Rogers et al.
2015/0248144 A1* 9/2015 Hong .................... G06F 1/1675
                                        361/679.27

FOREIGN PATENT DOCUMENTS

KR        10-1164432 B1   7/2012
KR        10-1374736 B1   3/2014
KR     10-2014-0057935 A   5/2014

* cited by examiner

*Primary Examiner* — Anthony Haughton
*Assistant Examiner* — Ingrid Wright
(74) *Attorney, Agent, or Firm* — Lee & Morse, P.C.

(57) ABSTRACT

A stretchable display device includes a display panel made of a stretchable material, a fastening structure fastened to an edge of the display panel, and a fastening fixing part fixed to the fastening structure and integrally connected to the edge of the display panel.

18 Claims, 16 Drawing Sheets

111

STRETCHABLE DISPLAY DEVICE AND METHOD OF MANUFACTURING THE SAME

CROSS-REFERENCE TO RELATED APPLICATION

Korean Patent Application No. 10-2015-0007458, filed on Jan. 15, 2015, in the Korean Intellectual Property Office, and entitled: "Stretchable Display Device and Method of Manufacturing the Same," is incorporated by reference herein in its entirety.

BACKGROUND

1. Field

Embodiments relate to a display device, and more particularly, to a stretchable display and a method of manufacturing the same.

2. Description of the Related Art

With the development of electronic technology, various display devices such as TVs, laptop PCs, tablet PCs, and mobile phones have become widely used.

A next-generation display device such as a stretchable display device has been developed recently.

SUMMARY

Embodiments are directed to a stretchable display device including a display panel made of a stretchable material, a fastening structure fastened to an edge of the display panel, and a fastening fixing part fixed to the fastening structure and integrally connected to the edge of the display panel.

The display panel may include a stretchable substrate made of a stretchable material. The fastening fixing part may be integrally connected to the stretchable substrate.

The fastening fixing part may be made of a same material as the stretchable substrate.

The stretchable substrate and the fastening fixing part may be made of poly dimethyl siloxane (PDMS).

The fastening structure may include an inlet through which the edge of the display panel passes and an inner region connected to the inlet.

The inlet of the fastening structure may have a cross sectional area smaller than that of the inner region of the fastening structure.

The display panel may include a stretchable substrate made of a stretchable material. The fastening fixing part may be made of a same material as the stretchable substrate and may be located in the inner region of the fastening structure.

A hardness of the fastening fixing part may be greater than a hardness of the stretchable substrate.

The fastening fixing part may be integrally connected to two edges of the stretchable substrate along a stretchable direction of the stretchable substrate and may be provided in the inner region of the fastening structure.

The fastening structure may include a fixing protrusion that fixes the fastening fixing part in the inner region.

The fastening structure may include a fixed surface having an inner cross sectional area that gradually decreases from the inner region toward the inlet to fix the fastening fixing part.

Embodiments are also directed to a method for manufacturing a stretchable display panel including injecting a liquefied stretchable material into a mold and hardening the liquefied stretchable material such that a stretchable substrate is formed by injection molding, manufacturing the stretchable display panel by forming a pixel unit and a driver on the stretchable substrate, providing a fastening structure having an inlet and an inner region, injecting a liquefied stretchable material into the inner region of the fastening structure, inserting an edge portion of the stretchable substrate into the inner region through the inlet, and hardening the liquefied stretchable material and molding a fastening fixing part in an inner region of the fastening structure.

In forming the fastening fixing part, an edge of the stretchable substrate may be integrally connected to the fastening fixing part.

In forming the stretchable substrate and the fastening fixing part, a poly dimethyl siloxane (PDMS) may be used as the liquefied stretchable material.

A cross sectional area of the inlet of the fastening structure may be larger than that of the inner region of the fastening structure.

In forming the stretchable substrate, the mold may be heated at a predetermined temperature to harden the stretchable material.

In forming the stretchable substrate, the stretchable material may be hardened at room temperature.

In forming the fastening fixing part, the fastening structure is heated at a temperature higher than a heating temperature of the mold in forming the stretchable substrate.

Forming the fastening fixing part may provide the fastening fixing part with a hardness greater than that of the stretchable substrate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
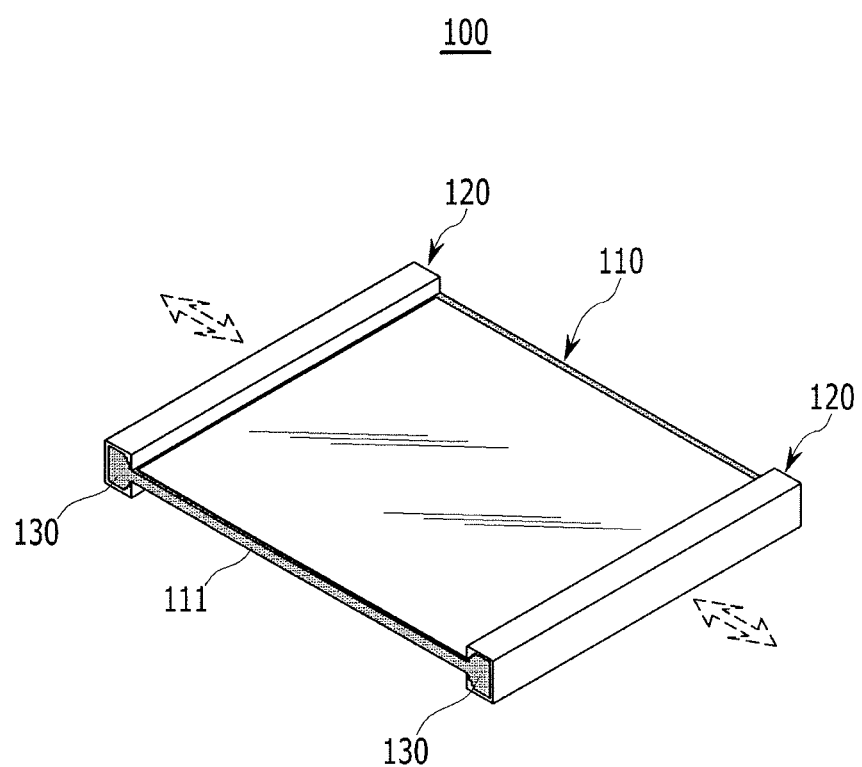
FIG. 1 illustrates a perspective view schematically depicting a stretchable display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a perspective view schematically depicting a stretchable display device according to an exemplary embodiment.

Referring to FIG. 1, a stretchable display device 100 according to an exemplary embodiment may include a stretchable display panel 100 and a fastening structure 120.

The stretchable display panel 110 displays an image. The stretchable display panel 110 may be made of a stretchable material that is stretchable by an external pressure. The stretchable display panel 110 may be stretchable in one direction when one edge is pulled or when both edges are pulled in the state in which the other edge is fixed and may be contractible to an original shape by an elastic restoring force.

Figure 2:
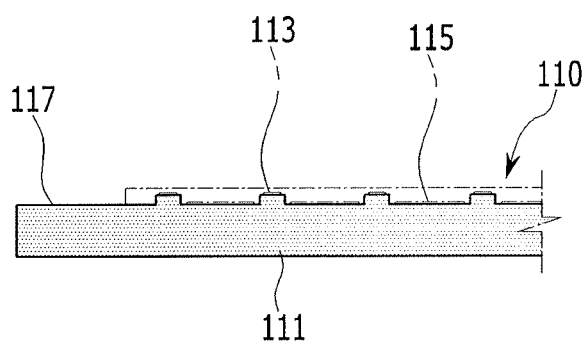
FIG. 2 illustrates a diagram schematically depicting a stretchable display panel applied to the stretchable display device according to an exemplary embodiment.

For example, as illustrated in FIG. 2, the stretchable display panel 110 may be manufactured by forming a display element including a plurality of pixel units 113 and a driving element including a plurality of drivers 115 on the stretchable substrate 111 having stretchability. The stretchable substrate 111 may have an upper surface formed with various patterns and island shapes to form the display element, the driving element, and the like.

The stretchable substrate 111 may be an insulating substrate including a stretchable material such as a poly dimethyl siloxane (PDMS) material. In addition to being stretchable, the stretchable substrate 111 may be also be, foldable, bendable, or rollable.

The stretchable substrate 111 may be stretchable, flexible, foldable, bendable, or rollable, such that an entire stretchable display device is flexible, stretchable, foldable, bendable, or rollable.

As the stretchable display panel 110, an organic light emitting diode (OLED), an electro luminescence (EL), a liquid crystal display (LCD), or the like may be adopted. In addition, the stretchable display panel 110 may adopt various configurations and driving schemes.

Figure 3:
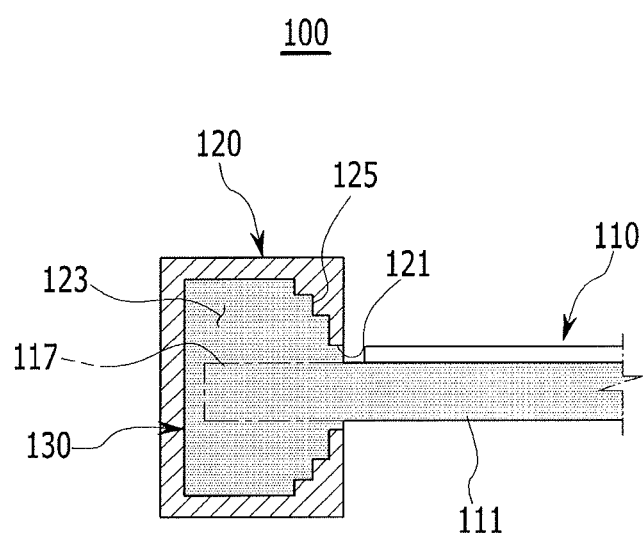
FIG. 3 illustrates a partial cross-sectional view depicting the stretchable display device according to the exemplary embodiment.

FIG. 3 illustrates a partial cross-sectional view depicting the stretchable display device according to the exemplary embodiment.

Referring to FIGS. 1 and 3, the fastening structure 120 may be fastened to the edge of the stretchable display panel 110. The fastening structure 120 may be fastened to both edges of the stretchable display panel 110. For example, the term "both edges" may refer to opposing edges of the stretchable display panel 110 in a stretchable direction of the stretchable display panel 110, as shown in FIG. 1.

For example, the fastening structure 120 may be provided in a case supporting the stretchable display device 100 or may be separately provided from the case. One edge of the stretchable display panel 110 may be fastened with the fastening structure 120 provided in the case and the other edge of the stretchable display panel 110 may be fastened with a separate fastening structure 120. In some implementations, one edge and the other edge of the stretchable display panel 110 may be each fastened with the separate fastening structure 120. The fastening structure 120 may be fastened with fastening portions 117 that are partitioned at both edges of the stretchable substrate 111 in the stretchable display panel 110.

The fastening structure 120 may be made of a hard material. The fastening structure 120 may be a heat transferable material and may be a material having low heat conductivity. The fastening structure 120 may include inlets 121 that correspond to both edges of the stretchable substrate 111 and that are formed along a length direction of the fastening structure 120. The fastening structure 120 may have an inner region 123 that is connected to the inlet 121.

The edges of the stretchable display panel 110, for example, the fastening portions 117, which are both edges of the stretchable substrate 111, may pass through the inlet 121 of the respective fastening structure 120. The inner region 123 may be a region in which the fastening portion 117 of the stretchable substrate 111 passing through the inlet 121 is enclosed with the body of the fastening structure 120.

The inlet 121 of the fastening structure 120 may have a cross sectional area smaller than that of the inner region 123. The inlet 121 may have a cross sectional area that is large enough to have the fastening portion 117 of the stretchable substrate 111 pass therethrough.

The stretchable display device 100 according to the exemplary embodiment may further include a fastening fixing part 130 that fastens and fixes the edge of the stretchable display panel 110 and the fastening structure 120. The fastening fixing part 130 may fasten and fix the fastening portion 117 of the stretchable substrate 111 and the fastening structure 120.

The fastening fixing part 130 may be a portion that is integrally connected with the fastening portion 117 of the stretchable substrate 111 at the edge of the stretchable display panel 110. The fastening fixing part 130 may be integrally connected to both edges depending on the stretchable direction of the stretchable substrate 111. The fastening fixing part 130 may be provided in the inner region 123 of the fastening structure 120 and may be fixed to the fastening structure 120.

The fastening fixing part 130 may be made of a stretchable material that is the same material as the stretchable substrate 111. For example, the fastening fixing part 130 may be made of poly dimethyl siloxane (PDMS) material, or the like. The fastening fixing part 130 may be provided in the inner region 123 of the fastening structure 120. The fastening fixing part 130 may be formed by molding the stretchable material in the inner region 123 of the fastening structure 120. The fastening fixing part 130 may have hardness greater than that of the stretchable substrate 111 to increase the fastening force with the fastening structure 120.

Figure 4:
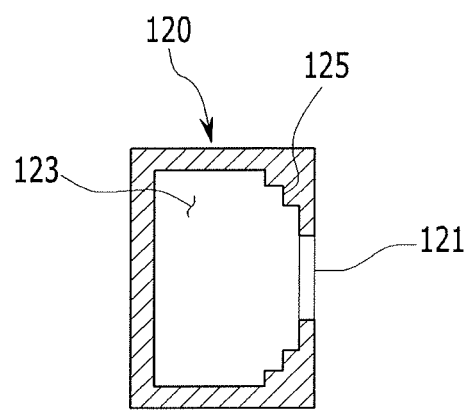
FIG. 4 illustrates a cross-sectional view depicting a fastening structure applied to the stretchable display device according to the exemplary embodiment.

As illustrated in FIG. 4, the fastening structure 120 according to some implementations may have a fixing protrusion 125 formed in the inner region 123 to fix the fastening fixing part 130 provided in the inner region 123.

For example, the fixing protrusion 125 may be provided at the inlet 121 in the inner region 123 of the fastening structure 120. The fixing protrusion 125 may be provided in a step form that is stepped from the inlet 121 toward the inner region 123. The fixing protrusion 125 may serve to increase a contact area of the fastening fixing part 130 with the inner side of the inner region 123, together with a plurality of stepped surfaces. For example, the fixing protrusion 125 may be engaged with the fastening fixing part 130 in the inner region 123 to prevent the fastening fixing part 130 from being separated toward an outer side of the inner region 123.

Figure 5:
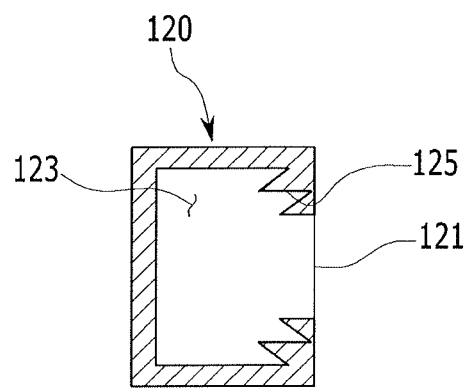
FIG. 5 illustrates a cross-sectional view depicting a modification example of the fastening structure applied to the stretchable display device according to the exemplary embodiment.

As illustrated in FIG. 5, the fixing protrusion 125 according to some implementations may be provided in a form of a sharp protrusion from the inlet 121 toward the inner region 123. The fixing protrusion 125 may be formed in plural and may be provided in a triangular pyramid form having a size increasing from the inlet 121 toward the inner region 123.

Figure 6:
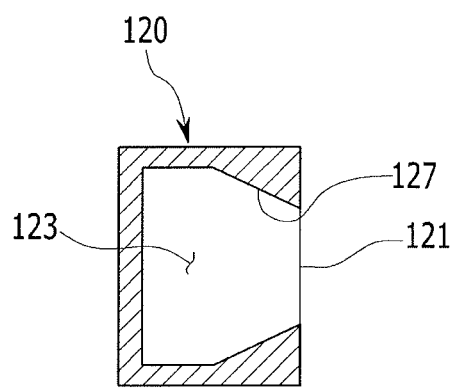
FIGS. 6 to 9 illustrate cross-sectional views depicting another modification example of the fastening structure applied to the stretchable display device according to the exemplary embodiment.
Figure 7:
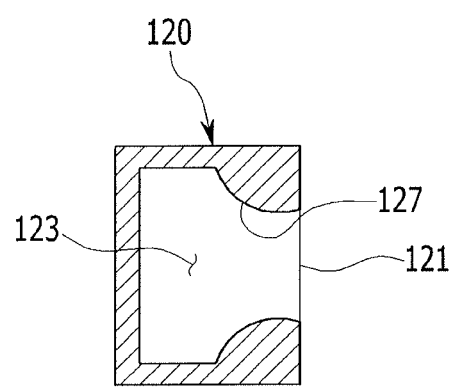

As illustrated in FIG. 6, the fastening structure 120 according to some implementations may be formed with a fixed surface 127 such that an inner cross sectional area of the inner region 123 gradually decreases from a middle portion of the inner region 123 toward the inlet 121 to fix the fastening fixing part 130 in the inner region 123. The fixed surface 127 may be provided as a flatly inclined surface such that a cross sectional area of the inner region 123 gradually increases from the end of the inlet 121 toward approximately a middle portion of the inner region 123. As illustrated in FIG. 7, the fixed surface 127 according to some implementations may be provided as a round surface such that a cross sectional area of the inner region 123 gradually increases from the end of the inlet 121 toward approximately a middle portion of the inner region 123.

Figure 8:
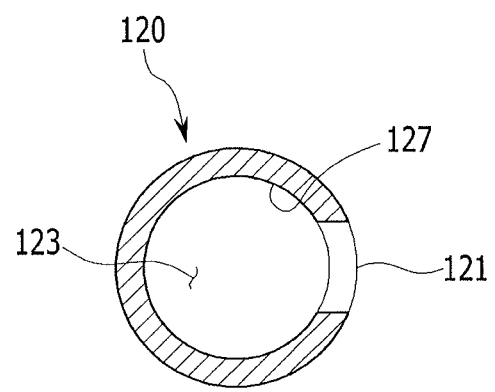

According to an implementation illustrated in FIG. 8, fastening structure 120, including the fixed surface 127 and the entire inner surface of the inner region 123 connected to the inlet 121, may have a circular shape. Accordingly, the fastening structure 120 may have approximately a C-shaped cross section and the inner surface of the inner region 123 may be provided with a circular fixed surface 127.

Figure 9:
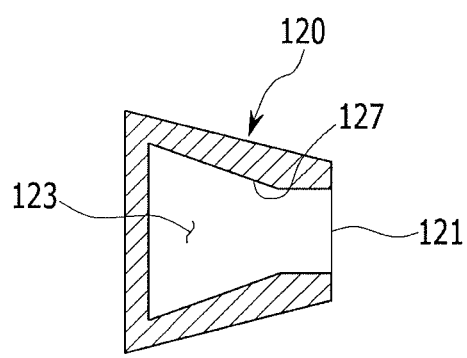

According to an implementation illustrated in FIG. 9, the fixed surface 127 may be provided as a flatly inclined surface such that a cross sectional area of the inner region 123 gradually increases from the end of the inlet 121 toward an entire span of the inner region 123. Accordingly, the fastening structure 120 may have approximately a 'ㄷ'-shaped cross section (for example, a trapezoidal shape with the inlet 121 located at the smallest end) and may be provided with the fixed surface 127 such that a cross sectional area of the inner region 123 gradually decreases toward the inlet 121.

Hereinafter, a method for manufacturing the stretchable display device 100 according to an exemplary embodiment configured as described above will be described with reference to the accompanying drawings.

FIGS. 10 to 16 illustrate manufacturing process diagrams for describing stages of a method for manufacturing a stretchable display device according to an exemplary embodiment.

Figure 10:
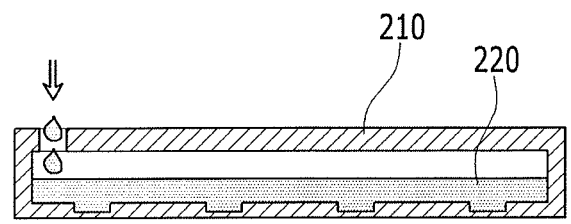
FIGS. 10 to 16 illustrate manufacturing process diagrams for describing a method for stages of manufacturing a stretchable display device according to an exemplary embodiment.

Referring to FIG. 10, a mold 210 in which an inner space having a predetermined volume is formed is provided, and a liquefied stretchable material 220 is injected into the inner space of the mold 210. The liquefied stretchable material 220 may be poly dimethyl siloxane (PDMS), for example. The mold 210 may be provided with various patterns such as groove and protrusion shapes.

Figure 11:
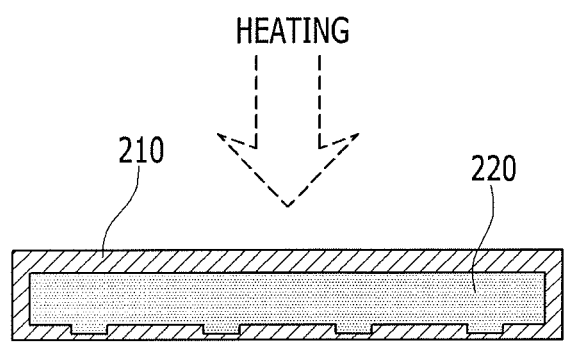

As illustrated in FIG. 11, the liquefied stretchable material 220 injected into the mold 210 may be hardened. In this process, a predetermined temperature of heat may be applied to the mold 210 to harden the stretchable material 220 inside the mold 210. In some implementations, the stretchable material 220 may be hardened at room temperature. In other implementations, heat may be applied to the mold 210 to harden the stretchable material 220.

Figure 12:
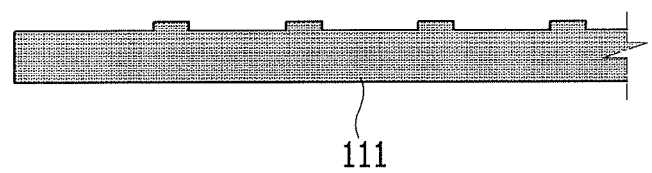

The hardened stretchable material 220 inside the mold 210 may be separated from the mold 210, thereby providing an injection-molded, stretchable substrate 111 as illustrated in FIG. 12. The process of manufacturing the stretchable substrate 111 may be the same as, for example, an injection process of manufacturing a light guide plate. The so manufactured stretchable substrate 111 may have an upper surface that includes various patterns and island shapes to form the display element, the driving element, and the like.

Figure 13:
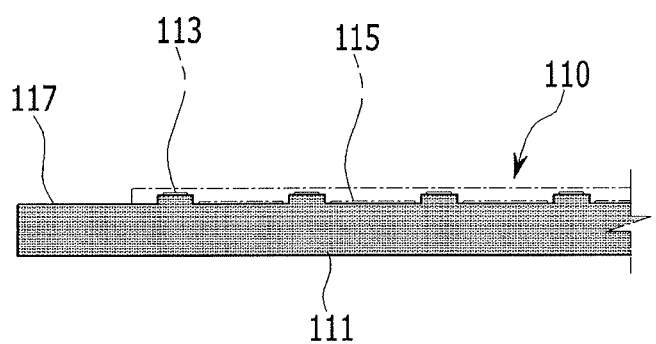

As illustrated in FIG. 13, the stretchable display panel 110 may be manufactured by forming the display element including the plurality of pixel units 113 and the driving element including the plurality of drivers 115 on the stretchable substrate 111. The stretchable display panel 110 may be provided with the fastening portions 117, each having a predetermined region, which are formed at both edges of the stretchable substrate 111.

Figure 14:
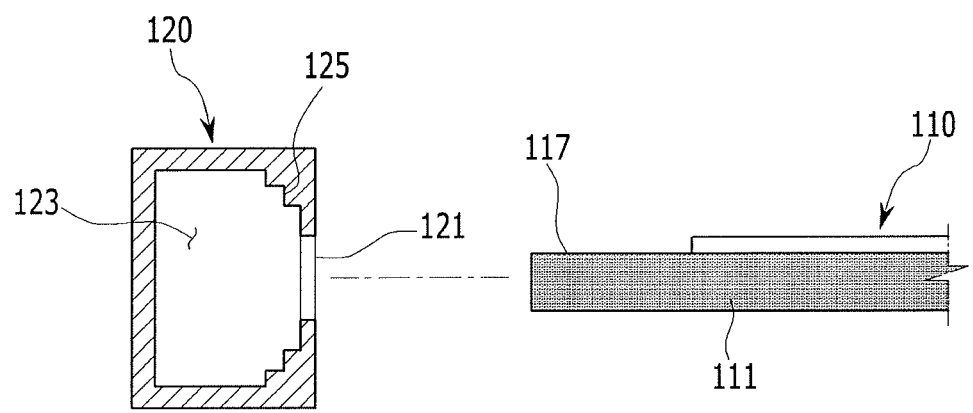

As illustrated in FIG. 14, the fastening structure 120 having the inlet 121 and the inner region 123 and the stretchable display panel 110 as described above may be provided.

The fastening structure 120 may be provided such that a cross sectional area of the inlet 121 is smaller than the inner cross sectional area of the inner region 123. As illustrated in FIGS. 4 and 5, the fastening structure 120 may be provided such that the fixing protrusion 125 is formed in the inner region 123. In other implementations, a fastening structure 120 having a form as illustrated in FIGS. 5 to 9 may be provided.

Figure 15:
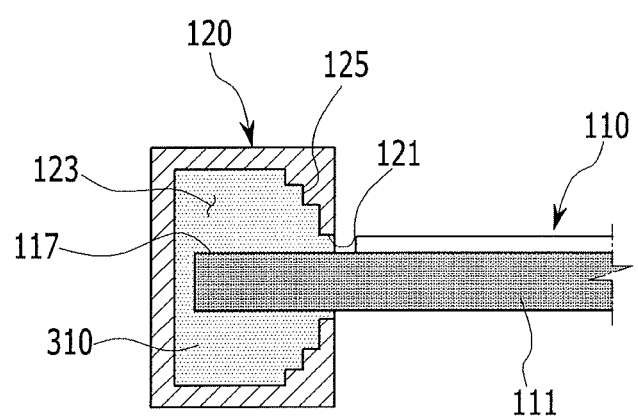

As illustrated in FIG. 15, a liquefied stretchable material 310 may be injected into the inner region 123 through the inlet 121 of the fastening structure 120. The liquefied stretchable material 310 may be the same material as that used to form the stretchable substrate 111. For example, the stretchable material 310 may be poly dimethyl siloxane (PDMS).

The fastening portion 117 of the stretchable substrate 111, which is an edge portion of the stretchable display panel 110, may be inserted into the inner region 123 through the inlet 121 of the fastening structure 120. The fastening portion 117 of the stretchable substrate 111 may be inserted into the inner region 123 through the inlet 121 and thus may be dipped in the liquefied stretchable material 310.

Figure 16:
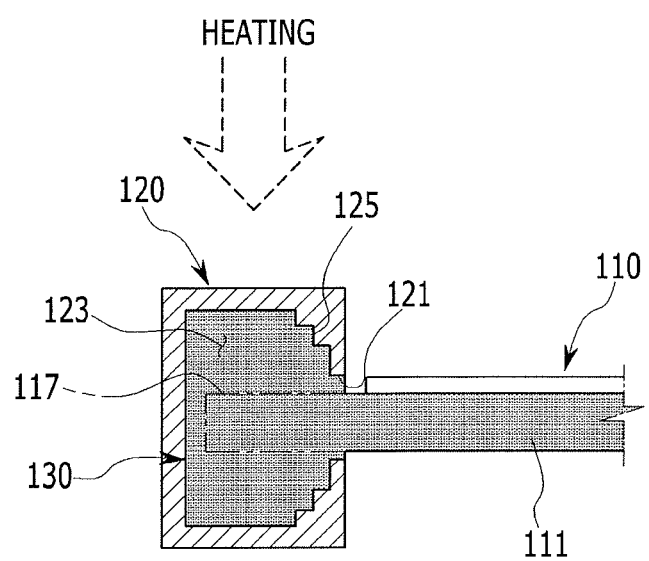

As illustrated in FIG. 16, the liquefied stretchable material (310: see FIG. 15) injected into the inner region 123 of the fastening structure 120 may be hardened. In this process, heat at a predetermined temperature may be applied to the fastening structure 120 to harden the stretchable material 310 (see FIG. 15) inside the fastening structure 120.

The temperature at which the liquefied stretchable material 310 is hardened (see FIG. 15) by applying heat to the fastening structure 120 may be higher than a temperature used to heat a mold in a previous process of molding the stretchable substrate 111.

As such, as the liquefied stretchable material 310 (see FIG. 15) may be hardened in the inner region 123 of the fastening structure 120. The fastening fixing part 130 of the stretchable material may be molded in the inner region 123 of the fastening structure 120.

The fastening fixing part 130 may be integrally connected to the fastening portion 117 of the stretchable substrate 111 in the inner region 123 of the fastening structure 120. The stretchable material 310 may be hardened in the state in which the fastening portion 117 of the stretchable substrate 111 is dipped in the liquefied stretchable material 310 (see FIG. 15) injected into the inner region 123 of the fastening structure 120.

When, in forming the fastening fixing part 130, the stretchable material 310 (see FIG. 15) is hardened at temperature higher than the hardening temperature of the stretchable material in the process of molding the stretchable substrate 111, the stretchable substrate 111 may be molded to have a greater hardness than that of the stretchable substrate 111.

According to the exemplary embodiment, by a series of processes as described above, the stretchable display device 100 as illustrated in FIGS. 1 and 3 may be manufactured.

As described above, the stretchable display device 100 according to the exemplary embodiment may include the fastening structure 120 having a cross sectional area of the inner region 123 larger than that at the inlet 121 and the fastening fixing part 130 integrally connecting the stretchable substrate 111 of the stretchable display panel 110 to the inner region 123 of the fastening structure 120.

Unlike the exemplary embodiment, if the stretchable display panel were to be fastened with a fastening structure using a fastening pin or an adhesive, the stretchable display panel could be damaged or easily separated from the fastening structure, due to the stress generated when the stretchable display panel is stretched.

However, according to the exemplary embodiment, the fastening fixing part 130 integrally connected with the stretchable substrate 111 of the stretchable display panel 110 is provided in the inner region 123 of the fastening structure 120 having a cross sectional area of the inner region 123 larger than that of the inlet 121, and therefore the stretchable display panel 110 is not easily separated from the fastening structure 120 when the stretchable display panel 100 is stretched.

Further, according to the exemplary embodiment, the stretchable substrate 111 and the fastening fixing part 130 are made of the same material and are integrally connected, thereby minimizing the stress applied to the fastening portion when the stretchable display panel 110 is stretched. Further, according to the exemplary embodiment, the hardness of the fastening fixing part 130 is greater than that of the stretchable substrate 111, thereby increasing the fastening force of the stretchable display panel 100 for the fastening structure 120.

By way of summation and review, a stretchable display device is a display device that has an elastic restoring force and that may be variously changed.

The stretchable display device may be variously changed and may be used as various applications. For example, the stretchable display device may be implemented as a wearable device as well as a portable device such as a tablet PC or a mobile phone.

The stretchable display device may be variously changed due to its own stretchability. It is desirable to minimize stress applied to a fastening structure when the stretchable display device is changed by stretching.

Embodiments provide a stretchable display device and a method of manufacturing the same having advantages of increasing a fastening force of a display panel to a fastening structure and minimizing a stress in response to a change in a display panel due to stretching. According to embodiments, it is possible to prevent the display panel from being easily separated from the fastening structure when the stretchable display panel is stretched and to minimize the stress applied to the fastened portion.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A stretchable display device, comprising:
    a display panel made of a stretchable material;
    a fastening structure fastened to an edge of the display panel, the fastening structure including an inlet through which the edge of the display panel passes and an inner region connected to the inlet; and
    a fastening fixing part fixed to the fastening structure and integrally connected to the edge of the display panel.

2. The stretchable display device as claimed in claim 1, wherein:
    the display panel includes a stretchable substrate made of a stretchable material, and
    the fastening fixing part is integrally connected to the stretchable substrate.

3. The stretchable display device as claimed in claim 2, wherein:
    the fastening fixing part is made of a same material as the stretchable substrate.

4. The stretchable display device as claimed in claim 3, wherein:
    the stretchable substrate and the fastening fixing part are made of poly dimethyl siloxane (PDMS).

5. The stretchable display device as claimed in claim 1, wherein:
    the inlet of the fastening structure has a cross sectional area smaller than that of the inner region of the fastening structure.

6. The stretchable display device as claimed in claim 5, wherein:
    the display panel includes a stretchable substrate made of a stretchable material, and
    the fastening fixing part is made of a same material as the stretchable substrate and is located in the inner region of the fastening structure.

7. The stretchable display device as claimed in claim 6, wherein:
    a hardness of the fastening fixing part is greater than a hardness of the stretchable substrate.

8. The stretchable display device as claimed in claim 6, wherein:
    the fastening fixing part is integrally connected to two edges of the stretchable substrate along a stretchable direction of the stretchable substrate and is provided in the inner region of the fastening structure.

9. The stretchable display device as claimed in claim 5, wherein:
    the fastening structure includes a fixing protrusion that fixes the fastening fixing part in the inner region.

10. The stretchable display device as claimed in claim 5, wherein:
    the fastening structure includes a fixed surface having an inner cross sectional area that gradually decreases from the inner region toward the inlet to fix the fastening fixing part.

11. A method for manufacturing a stretchable display panel, comprising:
    injecting a liquefied stretchable material into a mold and hardening the liquefied stretchable material such that a stretchable substrate is formed by injection molding;
    manufacturing the stretchable display panel by forming a pixel unit and a driver on the stretchable substrate;
    providing a fastening structure having an inlet and an inner region, injecting a liquefied stretchable material into the inner region of the fastening structure, and inserting an edge portion of the stretchable substrate into the inner region through the inlet; and hardening the liquefied stretchable material and forming a fastening fixing part in an inner region of the fastening structure by molding.

12. The method as claimed in claim 11, wherein:
in forming the fastening fixing part, an edge of the stretchable substrate is integrally connected to the fastening fixing part.

13. The method as claimed in claim 11, wherein:
in forming the stretchable substrate and in forming the fastening fixing part, a poly dimethyl siloxane (PDMS) is used as the liquefied stretchable material.

14. The method as claimed in claim 11, wherein:
a cross sectional area of the inlet of the fastening structure is larger than that of the inner region of the fastening structure.

15. The method as claimed in claim 11, wherein:
in forming the stretchable substrate, the mold is heated at a predetermined temperature to harden the stretchable material.

16. The method as claimed in claim 15, wherein:
in forming the fastening fixing part, the fastening structure is heated at a temperature higher than a heating temperature of the mold in forming the stretchable substrate.

17. The method as claimed in claim 16, wherein:
forming the fastening fixing part by molding provides the fastening fixing part with a hardness greater than that of the stretchable substrate.

18. The method as claimed in claim 11, wherein:
in forming the stretchable substrate, the stretchable material is hardened at room temperature.

* * * * *